United States Patent
Mezei et al.

(10) Patent No.: US 6,910,783 B2
(45) Date of Patent: Jun. 28, 2005

(54) TRANSPARENT LIGHT EMITTING MEMBERS AND METHOD OF MANUFACTURE

(75) Inventors: George A. Mezei, Fountain Valley, CA (US); Rick Lockwood, Garden Grove, CA (US); David J. Page, Painesville, OH (US); David B. Larson, Huntington Beach, CA (US)

(73) Assignee: Lumitex, Inc., Strongsville, OH (US)

( * ) Notice: Subject to any disclaimer, the term of this patent is extended or adjusted under 35 U.S.C. 154(b) by 119 days.

(21) Appl. No.: 10/264,576

(22) Filed: Oct. 4, 2002

(65) Prior Publication Data

US 2004/0066659 A1 Apr. 8, 2004

(51) Int. Cl.[7] ................................................. F21V 7/04
(52) U.S. Cl. ............................. 362/31; 362/26; 362/27; 362/241; 362/326; 362/347; 362/555; 385/146
(58) Field of Search .............................. 362/31, 26, 27, 362/28, 24, 241, 244, 326, 347, 551, 554, 556, 511, 555; 385/146; 83/917, 12, 875

(56) References Cited

U.S. PATENT DOCUMENTS

| | | | |
|---|---|---|---|
| 3,829,675 A | 8/1974 | Mariani | |
| 3,892,959 A | 7/1975 | Pulles | |
| 4,630,895 A | 12/1986 | Abdala, Jr. et al. | |
| 5,136,480 A | 8/1992 | Pristash et al. | |
| 5,377,084 A | 12/1994 | Kojima et al. | |
| 5,432,876 A | 7/1995 | Appeldorn et al. | |
| 5,521,342 A | 5/1996 | Bartley et al. | |
| 5,521,797 A | 5/1996 | Kashima et al. | |
| 5,598,280 A | 1/1997 | Nishio et al. | |
| 5,613,751 A | 3/1997 | Parker et al. | |
| 5,775,791 A | 7/1998 | Yoshikawa et al. | |
| 5,779,338 A | 7/1998 | Ishikawa et al. | |
| 5,786,665 A | * 7/1998 | Ohtsuki et al. | 313/512 |
| 5,845,038 A | * 12/1998 | Lundin et al. | 362/551 |
| 5,895,115 A | 4/1999 | Parker et al. | |
| 5,961,198 A | 10/1999 | Hira et al. | |
| 5,995,288 A | 11/1999 | Kashima et al. | |
| 6,565,225 B2 | * 5/2003 | Mabuchi et al. | 362/31 |

FOREIGN PATENT DOCUMENTS

WO    WO 00/50807    8/2000

* cited by examiner

*Primary Examiner*—Sandra O'Shea
*Assistant Examiner*—Bertrand Zeade
(74) *Attorney, Agent, or Firm*—Renner, Otto, Boisselle & Sklar, LLP

(57) ABSTRACT

Illuminators include transparent light emitting members having a pattern of rounded shallow notches or grooves in one or more surfaces of the members for causing internally reflected light to be emitted from the members. The notches or grooves may be cut using a circular cutting tool. The relative speed of the cutting tool and feed rate of the cutting tool relative to the members may be controlled to produce a roughened surface on the notches or grooves.

48 Claims, 5 Drawing Sheets

US 6,910,783 B2

TRANSPARENT LIGHT EMITTING MEMBERS AND METHOD OF MANUFACTURE

FIELD OF THE INVENTION

This invention relates to transparent light emitting members that have specially shaped notches or grooves in one or more surfaces to create a selected light output distribution from such members and their method of manufacture.

BACKGROUND OF THE INVENTION

It is well known that light transparent members including for example rods, panels, films, sheets and plates, can be made into light emitting members or illuminators by notching the members in a certain pattern. However, such notches are typically relatively sharp grooves, which do not scatter light very finely. Also the sharp grooves make the light emitting members more susceptible to breakage during installation or when placed under tension. The light emitting members may be used, for example, as a back light and/or front light for transparent or translucent devices such as LCDs, dials, gauges, pictures, point of sale advertising, decorative devices, and so on. Also such light emitting members may have special usages in optical scanning and array devices and the like.

SUMMARY OF THE INVENTION

In accordance with one aspect of the invention, the light emitting members have rounded shallow notches or grooves in one or more surfaces that scatter the light emitted from the members.

In accordance with another aspect of the invention, the rounded shallow notches or grooves reduce the risk of breakage of the light emitting members during installation or when the members are placed under tension.

In accordance with another aspect of the invention, the notches or grooves are generally U or C shaped.

In accordance with another aspect of the invention, the light emitting members with rounded shallow notches or grooves are relatively inexpensive and easy to mold.

In accordance with another aspect of the invention, the light emitting members with rounded shallow notches or grooves allow for easy low volume manufacturability of the members with any desired amount of smoothness or roughness on the faces of the notches or grooves.

In accordance with still another aspect of the invention, the light emitting members may have special arcuate shapes for use in special lighting applications.

These and other aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DETAILED DESCRIPTION OF THE INVENTION

Figure 1:
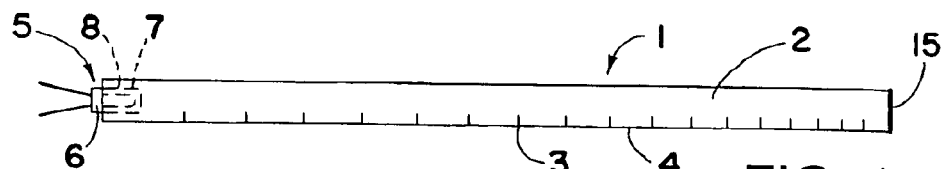
FIG. 1 is a schematic side elevation view of a rod-like transparent light emitting member of the present invention having a pattern of rounded shallow notches or grooves in a surface of the member for causing light entering the member to be reflected or refracted (i.e., emitted) from the member.
Figure 2:
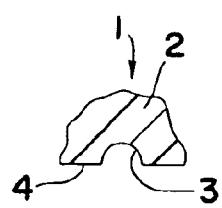
FIG. 2 is an enlarged fragmentary section through the light emitting member and one of the notches or grooves of FIG. 1.

Referring now in detail to the drawings, and initially to FIG. 1, there is shown one transparent light emitting member 1 of the present invention in the shape of an elongated rod 2 having a pattern of notches or grooves 3 in a surface 4 of the member for causing light that is transmitted through the member by internal reflection to be reflected or refracted out of the member as well known in the art. However, the notches or grooves 3 of the present invention, rather than being relatively sharp grooves as is conventional practice, are rounded shallow notches or grooves each having a generally U or C cross-sectional shape as schematically shown in FIG. 2. These rounded notches or grooves 3 may have a minimum depth and width of radius of no more than a few thousandths of an inch, depending on the length and thickness of the light emitting member, and have the advantage that they will scatter the light more finely than sharp grooves and will reduce the risk of breakage of the members during installation or when the members are placed under tension. Also the surfaces of the notches may be smooth or textured or roughened as desired to extract less or more light out through the notches or grooves.

Such light emitting members may be molded or cast or machined or cut out of any suitable transparent, clear or colored (including scintillating or fluorescent) material including glass or plastic such as acrylic, polycarbonate, styrene, or urethane or the like. The notches or grooves 3 may be painted or covered with a reflective color. Also, different notches may be coated with different colors for decorative or visibility purposes when the light emitting member is lighted by one or more white light sources.

Such light emitting members may be lighted from one or both end edges using any suitable light source 5. The rod-like light emitting member 2 of FIG. 1 is shown lighted from one end by a narrow angle light emitting diode (LED) 6 inserted in a slot, cavity or opening 7 machined, molded, cast or otherwise formed in the light emitting member. Light source 5 may be held in place within the opening 7, for example, by an interference fit or by embedding, potting or bonding the light source in place using a suitable embedding, potting or bonding material 8. Bonding can also be accomplished using a variety of methods that do not incorporate extra material, for example, thermobonding, heat staking, ultrasonic or plastic welding or the like. Other methods of bonding include insert molding and casting around the light source.

Figure 4A:
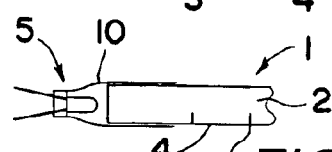
FIGS. 4a and 4b are schematic fragmentary side elevation views of an end portion of a light emitting member of the present invention showing alternative ways of optically coupling a light source to an edge of the member.
Figure 4B:
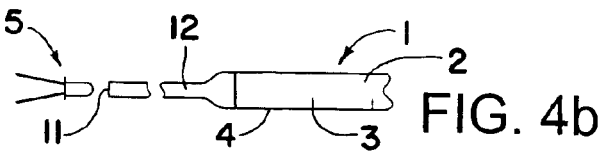

The light source 5 may also be held adjacent an edge of light emitting member 1 using for example a few drops of adhesive, or by heat shrinking a heat-shrinkable tube 10 around both the light source 5 and an edge of the light emitting member 1 as schematically shown in FIG. 4a. Also a remote light source 5 may be optically coupled to the edge of the light emitting member by focusing the light source on the input surface 11 of a light guide 12 suitably connected to the light emitting member as schematically shown in FIG. 4b.

If LEDs are used as the light source, suitable holes 7 may be molded or cast in one or more edges of the light emitting member for receipt of the LEDs as schematically shown in FIG. 1.

Using LEDs as the light source has the benefit that LEDs produce very little heat, consume small amounts of electric power, have a relatively long life, are relatively inexpensive, are not damaged by vibration, and do not produce EMI. However, other types of light sources may also be used including, for example, an arc lamp, an incandescent bulb, a lens end bulb, a line light, a halogen lamp, a neon bulb, a fluorescent tube, a fiber optic light pipe transmitting from a remote source, a laser or laser diode, or any other suitable light source.

The density and/or depth or size of the notches 3 may be varied along the surface of the light emitting member 1 in order to obtain a selected light output distribution from the member. For example, the amount of light traveling through the light emitting member will ordinarily be greater in areas closer to the light source than in areas further removed from the light source. The pattern of notches or grooves 3 may be used to adjust for the light variances within the light emitting member, for example, by placing the notches 3 closer together as the distance from the light source increases to provide a more uniform light output distribution from the light emitting member. Also, depending on the length and cross-sectional thickness of the light emitting member, the notches 3 may be made progressively deeper and/or wider with increased distance from the light source to provide a more uniform light output from the member.

When the light emitting member is lighted from one end only as shown in FIG. 1, placing the notches 3 progressively closer together and/or making the notches progressively deeper and/or wider as the distance from the lighted end edge increases will result in a more uniform light output distribution from the light emitting member. Further, the faces of the notches may be made progressively more textured or rougher with increased distance from the light source to provide a more uniform light output distribution from the member.

A reflective film or coating 15 may be provided on the non-lighted end edge of the light emitting member (if lighted from only one end edge as schematically shown in FIG. 1) as by applying a reflective film to such non-lighted end edge or coating such non-lighted end edge with white or silver reflective paint to minimize light loss from such non-lighted end edge.

Figure 3:
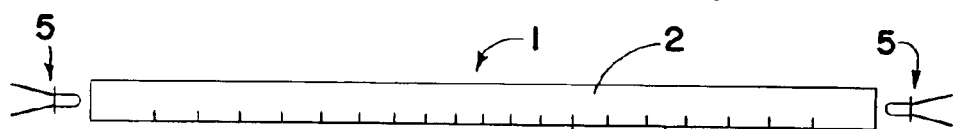
FIG. 3 is a schematic side elevation view of a rod-like transparent light emitting member of the invention shown lighted from both ends rather than just one end as shown in FIG. 1.

The light emitting member 1 may also be lighted from both ends as schematically shown in FIG. 3 for increased light output. In that event, the notches or grooves 3 may be placed closer and closer together as the distance from both lighted end edges increases toward the middle where the concentration of the notches will be greatest to provide a more uniform light output distribution from the light emitting member.

Figure 5:
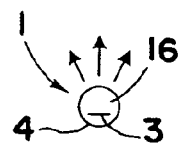
FIGS. 5–9 are schematic end elevation views of rod-like light emitting members of the type shown in FIGS. 1–3 having different cross-sectional shapes, FIG. 5 showing a cylindrical cross-sectional shape, FIG. 6 showing an elliptical cross-sectional shape, FIG. 7 showing a semi-cylindrical cross-sectional shape, FIG. 8 showing a rectangular cross-sectional shape, and FIG. 9 showing a triangular cross-sectional shape.
Figure 6:
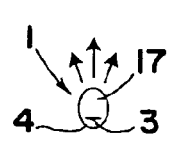
Figure 7:
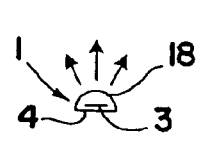

FIG. 5 shows the rod-like light emitting member 1 of the invention as having a cylindrical cross-sectional shape 16. However, light emitting member 1 may have other cross-sectional shapes as well for varying the output ray angle distribution of the emitted light to suit a particular application. For example, changing the cross-sectional shape of the member 1 from the cylindrical cross section 16 shown in FIG. 5 to an elliptical cross section 17 as shown in FIG. 6 will narrow the view angle of the light produced, whereas changing the cross-sectional shape to a semi-cylindrical cross section 18 as shown in FIG. 7 will widen the view angle.

Figure 8:
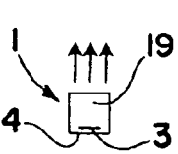
Figure 9:
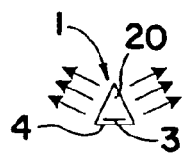
Figure 10:
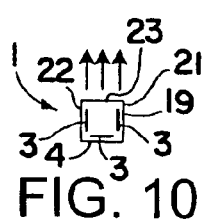
FIG. 10 is a schematic end elevation view of a rod-like light emitting member of the present invention having a rectangular cross-sectional shape similar to FIG. 8 but with three sides having rounded shallow notches or grooves instead of just one as shown in FIG. 8 to produce a brighter light output.

If a non-angular light output is desired, a rectangular cross-sectional shape 19 as shown in FIG. 8 or a triangular cross-sectional shape 20 as shown in FIG. 9 may be used. Also, the light output distribution from a light emitting member 1 with a rectangular cross-sectional shape 19 can be made brighter by notching three of the four sides 4, 21, 22 and 23 instead of just one of the sides 4 as schematically shown in FIG. 10.

Figure 12:
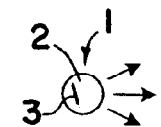
FIGS. 12 and 14 are schematic end elevation views of the light emitting members of FIGS. 11 and 12, respectively, as seen from the right ends thereof.
Figure 11:
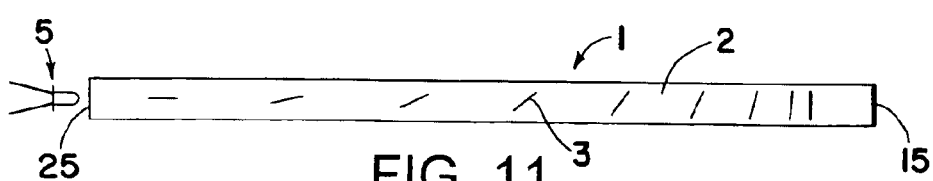
FIGS. 11 and 13 are schematic side elevation views of other rod-like light emitting members of the present invention having different notching patterns to produce a desired light output distribution from such members.

FIGS. 11 and 12 show a variation of the notching pattern along a rod-like light emitting member 1 in which the notches 3 closest to the lighted end 25 are made relatively parallel to the light emitting member to cause a relatively small percentage of the transmitted light to be emitted and the notches 3 further removed from the lighted end are made more and more perpendicular to the axis of the light emitting member as the distance from the lighted end increases to cause a greater percentage of the transmitted light to be emitted to produce a more uniform light output distribution from the light emitting member.

Figure 14:
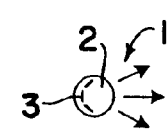
Figure 13:
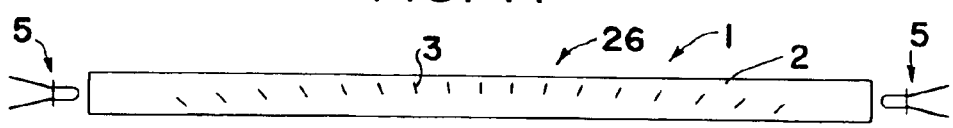

FIGS. 13 and 14 show another pattern of notches 3 extending along the length of a rod-like light emitting member 1 that is lighted from both ends. In this embodiment the notches 3 are located along an arc 26, with the notches closest to the top surface of the member adjacent the middle producing brighter light when viewed from the proper angle.

Figure 15:
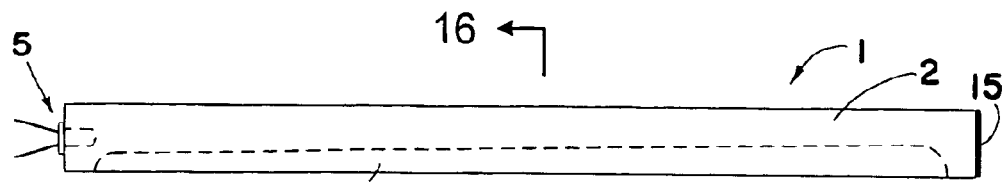
FIG. 15 is a schematic side elevation view of another rod-like light emitting member of the present invention having a rounded shallow notch or groove extending longitudinally along the member.
Figures 16, 18:
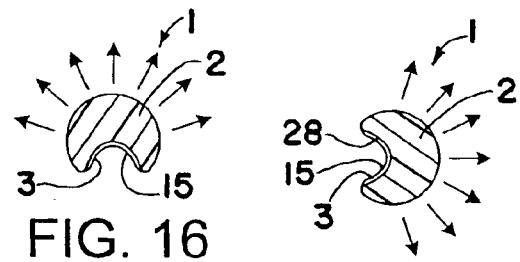
FIG. 16 is a schematic transverse section through the light emitting member and rounded groove of FIG. 15, taken along the plane of the line 16—16 thereof.
FIG. 18 is a schematic transverse section through the light emitting member and one of the dimples of FIG. 17, taken along the plane of the line 18—18 thereof.

FIGS. 15 and 16 show another rod-like light emitting member 1 of the invention in which a rounded shallow notch or groove 3 extends along the length of the member for causing light to be emitted therefrom. The groove 3 may be coated with a suitable reflective material 15 such as reflective paint or tape as schematically shown in FIG. 16 to increase its effectiveness in reflecting light.

If the light emitting member 1 of FIGS. 15 and 16 is lighted from one end only as schematically shown in FIG. 15, the depth of the light emitting groove 3 may if desired progressively increase as the distance from the lighted end increases to produce a more uniform light output distribution. Also, the unlighted end edge of the light emitting member 1 may be coated with a suitable reflective material 15 such as reflective paint or tape.

If the light emitting member 1 of FIGS. 15 and 16 is lighted from both ends, the groove 3 may if desired be made shallower at the ends and progressively deeper from the ends toward the middle to produce a more uniform light output distribution from the member. Moreover, while the rod-like light emitting member 1 shown in FIGS. 15 and 16 has a generally cylindrical cross section, the light emitting member may have other cross-sectional shapes including for example the semi-cylindrical, elliptical, square and triangular shapes previously discussed to obtain a desired light output distribution to suit a particular application. Regardless of the shape of the rod-like light emitting members, the notches or grooves may be provided on more than one side of the members as desired. Also, any of the light emitting members of the present invention may be curved along their length to suit a particular application.

Figure 17:
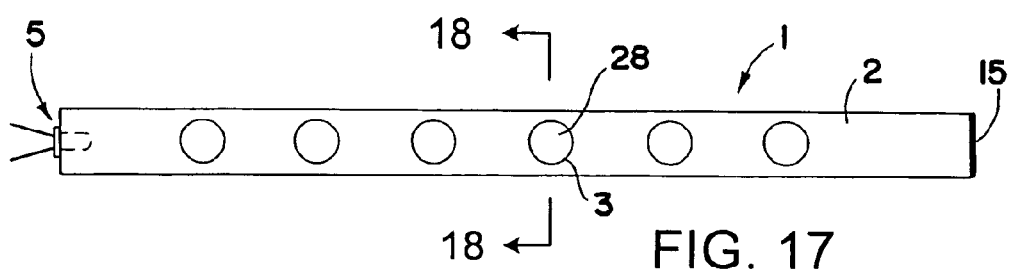
FIG. 17 is a schematic side elevation view of another rod-like light emitting member of the present invention having longitudinally spaced notches or grooves along the length of the member in the shape of rounded shallow dimples.

FIGS. 17 and 18 show another rod-like light emitting member 1 of the invention in which a plurality of longitudinally spaced notches 3 in the shape of rounded shallow dimples 28 are provided along the length of the member for causing light to be emitted therefrom. If the light emitting member is lighted from one end only as shown in FIG. 17, the dimples 28 may be made progressively deeper and/or closer together as the distance from the light source increases to produce a more uniform light output distribution. The surface of the dimples 28 may be coated with a suitable reflective material 15 such as reflective paint or tape as schematically shown in FIG. 18. Also, the unlighted end edge of the light emitting member may similarly be coated with a suitable reflective coating 15.

If the light emitting member 1 of FIGS. 17 and 18 is lighted from both ends, the dimples 28 may be made progressively deeper or closer together as the distance from both ends increases toward the middle with the depth of the dimples being greatest or the spacing between dimples being closest together at the middle to produce a more uniform light output distribution. While the light emitting member 1 shown in FIGS. 17 and 18 has a cylindrical cross-sectional shape, the member may have any of the other cross-sectional shapes previously described to fit a particular application. Also, the dimples 28 may be elongated and be provided along more than one side of the member if desired. In addition, the member itself may be curved along its length to suit a particular application.

Figure 19:
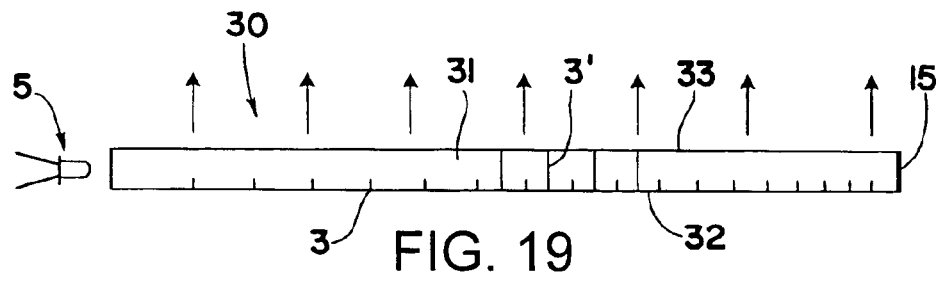
FIG. 19 is a schematic side elevation view of another light emitting member of the present invention in the shape of a panel having a pattern of rounded shallow notches or grooves in a surface of the member.
Figure 20:
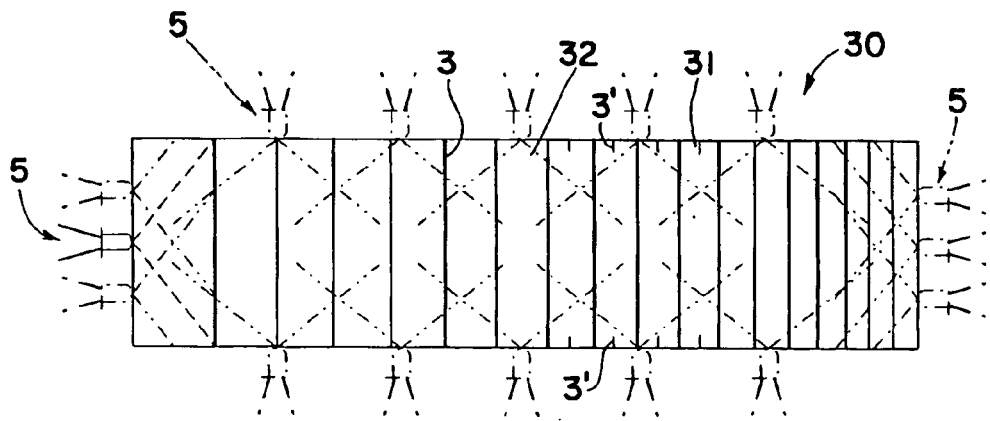
FIG. 20 is a schematic bottom plan view of the light emitting member of FIG. 19.

FIGS. 19 and 20 show another light emitting member 30 of the invention in the shape of a panel 31 having a greater cross-sectional width than thickness and bottom and top surfaces 32 and 33. The panel 31 may be lighted from one or both end edges and also from one or both side edges as schematically shown in FIG. 20. The number of light sources 5 utilized will depend on the size of the panel as well as the type of light sources used and the brightness and uniformity of light output desired. If LEDs 6 are used as the light source, wide viewing angle LEDs may be used for lighting the panel as opposed to the narrow viewing angle LEDs used to light rod-like light emitting members.

A pattern of rounded shallow generally U or C shaped notches or grooves 3 having the cross-sectional shape shown in FIG. 2 may be provided in one or more surfaces of the panel member 31 for causing transmitted light to be emitted therefrom. If the panel is lighted from only one end edge, the notches or grooves 3 may be placed closer together as the distance from the lighted end edge increases to provide a more uniform light output distribution from the panel. Moreover, additional notches or grooves 3' may be provided in one or more edges of the panel member 31 in order to reflect the light wherever it is needed.

Figure 21:
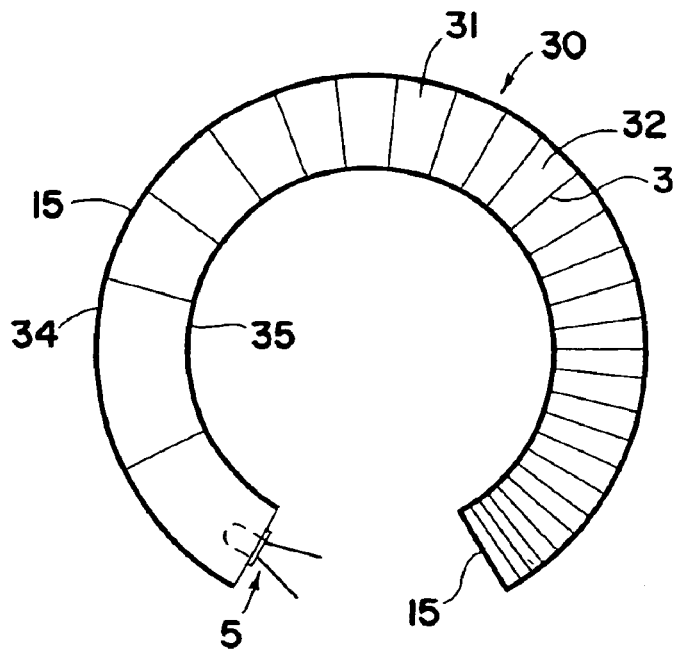
FIG. 21 is a schematic bottom plan view of another panel-like light emitting member of the present invention that is arcuately shaped with spaced apart ends and is lighted from one end only.
Figure 22:
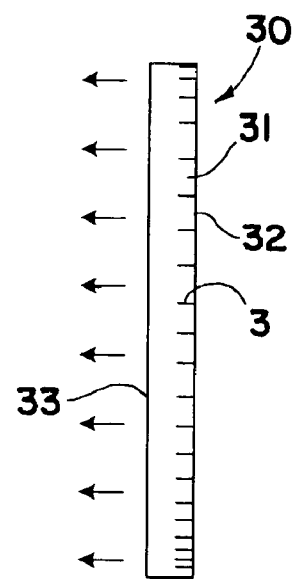
FIG. 22 is a schematic side elevation view of the light emitting panel member of FIG. 21 as seen from the right side thereof.
Figure 23:
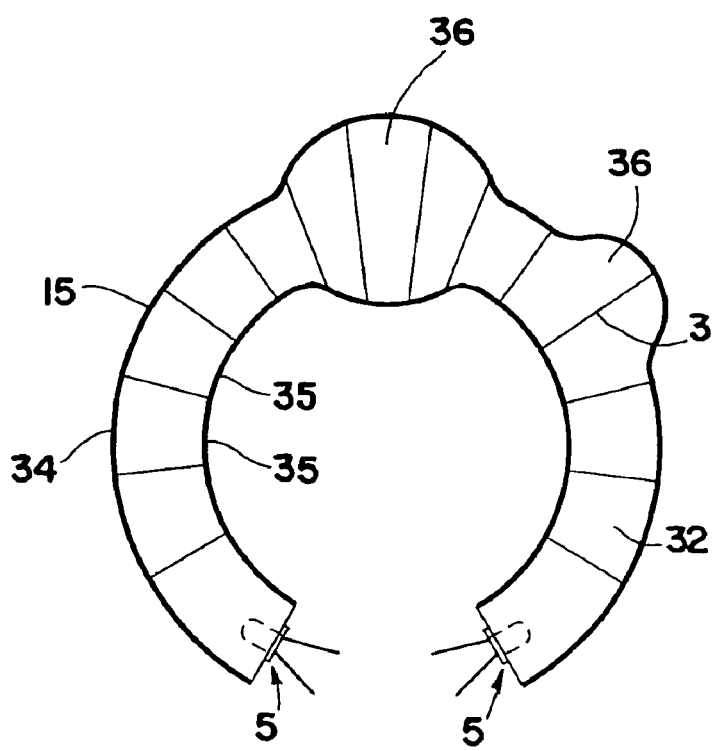
FIG. 23 is a schematic bottom plan view of another arcuately shaped light emitting panel member of the present invention that has sideways enlargements and is lighted from both ends.
Figure 24:
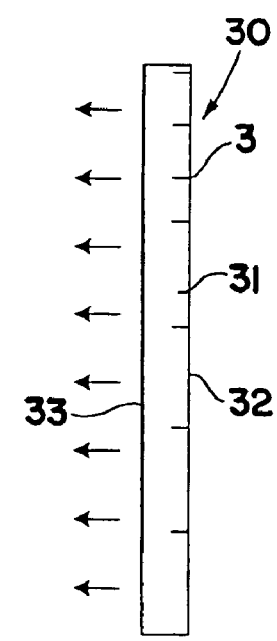
FIG. 24 is a schematic side elevation view of the light emitting panel member of FIG. 23 as seen from the right side thereof.
Figure 25:
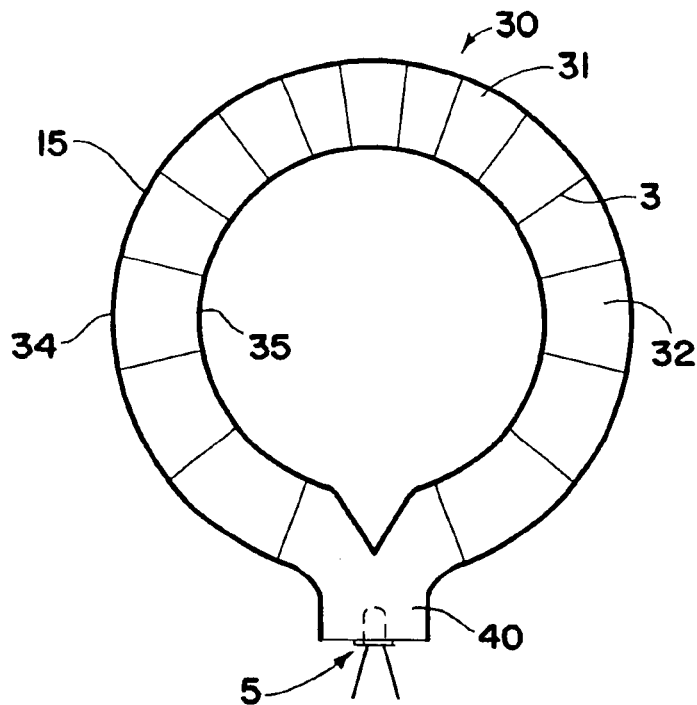
FIG. 25 is a schematic bottom plan view of another arcuately shaped light emitting panel member of the present invention which has two ends that are joined together and lighted by a single light source.
Figure 26:
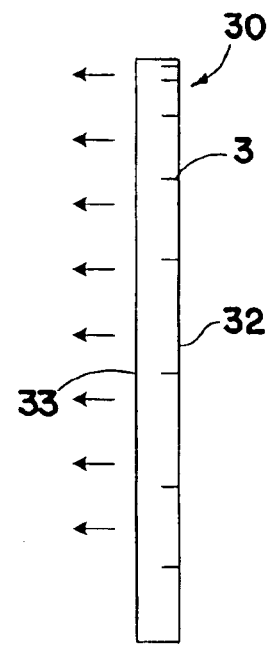
FIG. 26 is a schematic side elevation view of the light emitting panel member of FIG. 25 as seen from the right side thereof.

The light emitting panel 31 shown in FIGS. 19 and 20 is substantially rectangular in shape. However, the light emitting panel 31 may also be arcuately shaped as schematically shown in FIGS. 21–28. The curved side edges 34 and 35 of the arcuately shaped panels 31 should either be highly polished or covered with a reflective material or coating 15 such as paint to reflect light back into the panel. Such arcuately shaped panels may be lighted from one end edge as schematically shown in FIG. 21 or lighted from both end edges as schematically shown in FIG. 23. Moreover, the arcuate panels may have sideways enlargements 36 along their length as schematically shown in FIG. 23. Further, the ends of the arcuately shaped panels may be joined together at 40 and lighted by a single light source 5 as schematically shown in FIG. 25.

Figure 27:
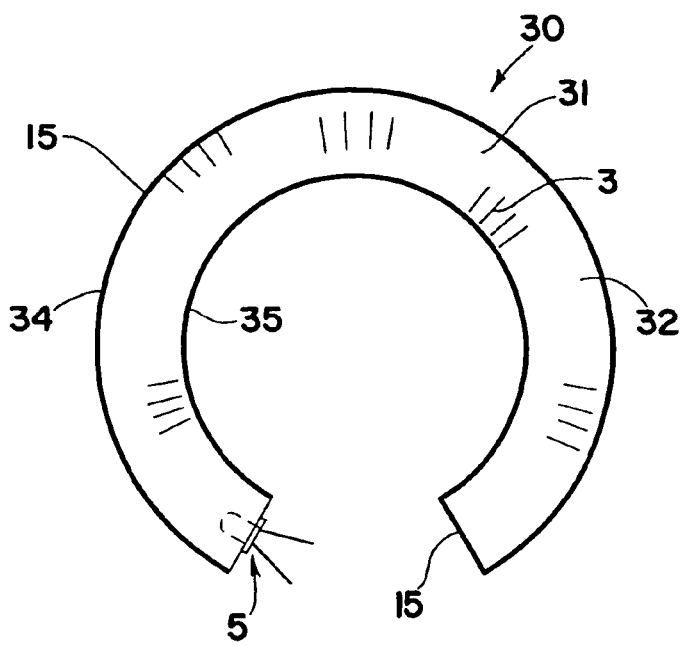
FIG. 27 is a bottom plan view of another arcuately shaped light emitting panel member of the present invention with a selective (non-uniform) notching pattern in a surface of the member to produce a selective (non-uniform) light output distribution pattern from the member.
Figure 28:
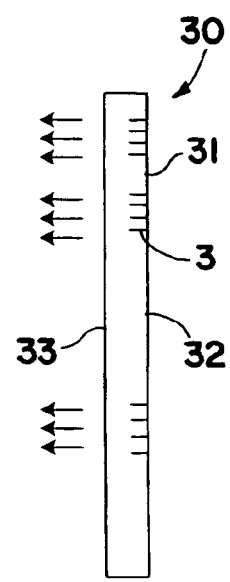
FIG. 28 is a schematic side elevation view of the light emitting panel member of FIG. 27 as seen from the right side thereof.

If a uniform light output distribution is desired from the arcuately shaped panels, the notches 3 may be placed closer and closer together (or made deeper and deeper or larger and larger) as the distance from the lighted edges increases as schematically shown in FIGS. 19–26. Alternatively, if a selective (non-uniform) light output distribution is desired, for example, if only certain areas need lighting, the notches 3 may be grouped in special patterns on selected areas of the panel 31 as schematically shown in FIGS. 27 and 28.

The arcuate shaped panels 31 are shown in FIGS. 21–28 as being generally ring shaped. However, such panels may also have other arcuate shapes including for example "J", "S" or "U" shapes.

Figure 29:
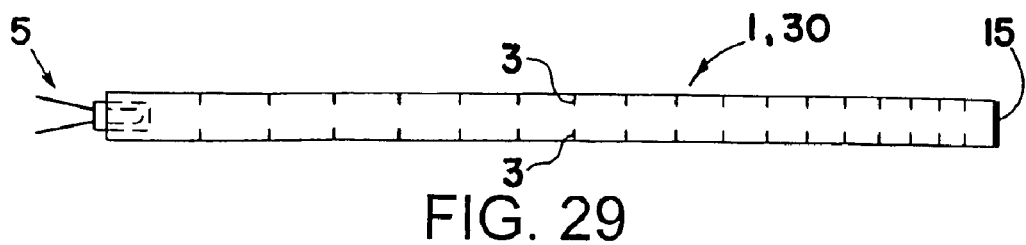
FIG. 29 is a schematic side elevation view of a light emitting member of the present invention having a notched pattern in two or more sides of the member to produce a selective light output distribution pattern from the member.
Figure 30:
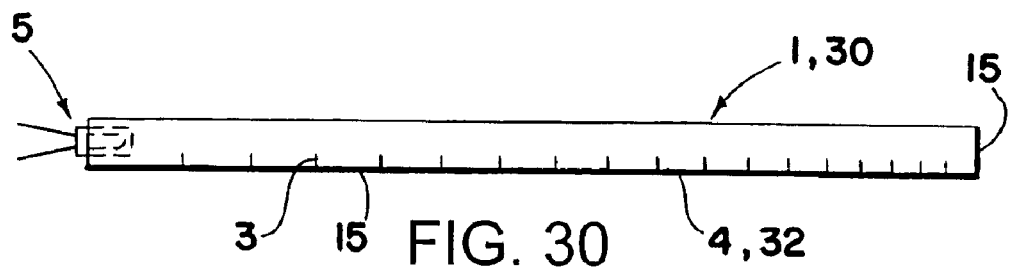
FIG. 30 is a schematic side elevation view of a light emitting member of the present invention having a reflective coating or film covering the notched surface of the member to reflect light back through the member.

Any of the light emitting members of the invention may also have patterns of rounded shallow notches or grooves on more than one side. FIG. 29 shows a light emitting member 1 or 30 having a pattern of notches or grooves 3 on both the top and bottom surfaces of the member to produce a specified lighting pattern. Also, any of the light emitting members of the invention may have a suitable reflective coating or film on different surfaces of the members to reflect light back into or through the members. FIG. 30 schematically shows one such light emitting member 1 or 30 having a reflective layer 15 on the notched side 4 or 32 to reflect light back through the other side and on the end edge opposite the lighted end edge to reflect light back into the member.

Figure 31:
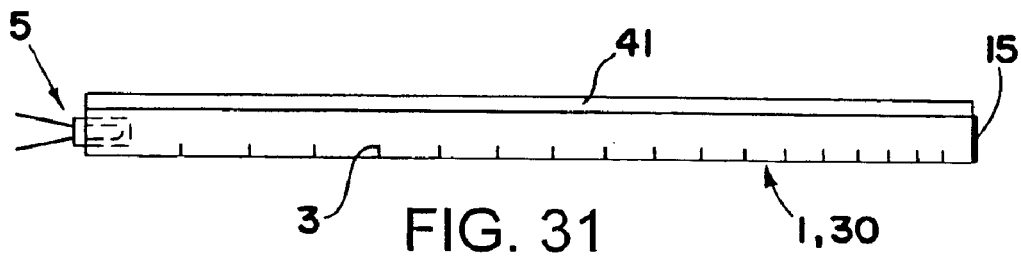
FIG. 31 is a schematic side elevation view of a light emitting member of the present invention having a sheet or film such as a diffuser, brightness enhancement film, or other optical device adjacent the member to alter the light output distribution from the member.

Moreover, any of the light emitting members 1 or 30 of the invention may have a suitable sheet, film or coating 41 such as a diffuser, brightness enhancement film or other optical device adjacent one or more sides of the member as schematically shown in FIG. 31 to alter the light output distribution from the member, for example, make it more even or brighter or change the view angle.

Figure 32:
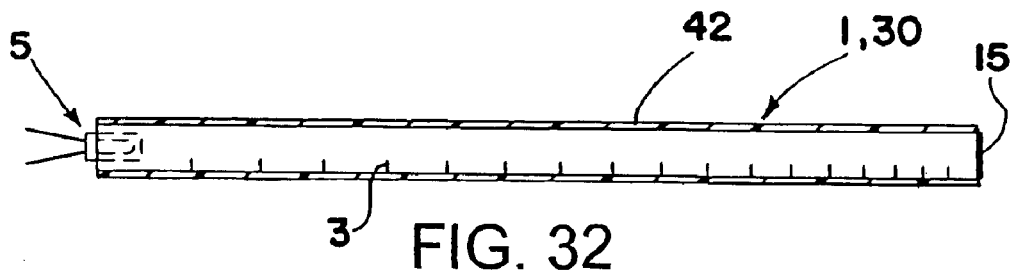
FIG. 32 is a schematic side elevation view of a light emitting member of the present invention having a UV protective film or sleeve covering the member.

If the light emitting members are used outdoors and are vulnerable to the sun's UV rays, a transparent UV protective film or sleeve 42 may cover the light emitting members 1 or 30 as schematically shown in FIG. 32. Also a white or mirror-type background may be provided for the members if desired.

Figure 33:
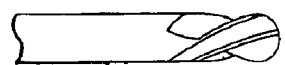
FIG. 33 is a schematic side elevation view of a cutting tool such as a ball mill that may be used to cut the notches or grooves in the light emitting members of the present invention.

These various light emitting members with rounded shallow notches or grooves are relatively easy and inexpensive to mold. Also such members allow for easy low volume manufacturability because little or no tooling is required for custom applications. Low volume manufacturability may involve using a low speed circular cutting tool such as a ball mill 45, schematically shown in FIG. 33, with a high feed rate of the cutting tool and/or members such that the cutting tool will leave tool marks on the face of the notches or grooves thus producing a textured or roughened surface to extract more of the light through the notches or grooves. The amount of texturing or roughness of the notches or grooves may be varied along the surface of the light emitting members in order to obtain a selected light output distribution from the members by varying the cutter speed and/or feed rate. For example, the notches or grooves may be made progressively more textured or roughened with increased distance from the light source to provide a more uniform light output distribution from the members. Also the depth of the notches or grooves may be progressively increased or decreased by progressively increasing or decreasing the depth of the cutting tool.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs a specified function of the described component (e.g., that is functionally equivalent), even though not structurally equivalent to the disclosed component which performs the function in the herein illustrated exemplary embodiments of the invention. Also, all of the disclosed functions may be computerized and automated as desired. In addition, while a particular feature of the invention may have been disclosed with respect to only one of several embodiments, such feature may be combined with one or more other features of the other embodiments as may be desired and advantageous for any given or particular application.

What is claimed is:

1. An illuminator comprising a transparent rod-like light emitting member having at least one light receiving end edge for receiving light from a light source for transmission through said member by internal reflection, and a pattern of elongated shallow notches in a surface of said member for causing light to be reflected or refracted out of said member, the axes of at least some of said notches in said surface being oriented at different angles relative to the axis of said member along the length of said member to obtain a selected light output distribution from said member.

2. The illuminator of claim 1 wherein said notches are substantially U or C shaped.

3. The illuminator of claim 1 wherein said notches are spaced closer together with increased distance from the light receiving edge to produce a more uniform light output distribution from said member.

4. The illuminator of claim 1 wherein said notches have a greater depth with increased distance from the light receiving end edge to produce a more uniform light output distribution from said member.

5. The illuminator of claim 1 wherein said notches are spaced closer together and have a greater depth with increased distance from the light receiving end edge to produce a more uniform light output distribution from said member.

6. The illuminator of claim 1 wherein said notches are located on said member wherever light output is desired.

7. The illuminator of claim 1 wherein said notches are grouped in special patterns on selected areas of said member for causing light to be emitted at said select areas.

8. The illuminator of claim 1 wherein said notches are non-uniformly located on said member.

9. The illuminator of claim 1 wherein said member receives light from a single light source.

10. The illuminator of claim 1 wherein said member receives light from multiple light sources.

11. The illuminator of claim 8 wherein said member has opposite end edges that receive light from said light sources.

12. The illuminator of claim 8 wherein said member has a plurality of edges that receive light from said light sources.

13. The illuminator of claim 1 wherein the light source is a remote light source that is optically coupled to said edge by a light guide.

14. The illuminator of claim 1 wherein said notches are molded in said member.

15. The illuminator of claim 1 wherein said light source is molded in said edge of said member.

16. The illuminator of claim 1 wherein said notches are machined in said member.

17. The illuminator of claim 1 wherein said light source is received in a slot, cavity or opening in said edge of said member.

18. The illuminator of claim 17 wherein said light source is retained in said slot, cavity or opening by at least one of: a press fit, adhesive, embedding, potting and bonding material.

19. The illuminator of claim 1 wherein said light source is an LED that is received in a hole in said edge of said member.

20. The illuminator of claim 1 further comprising another member in close proximity to said member for altering the light output distribution from said illuminator.

21. The illuminator of claim 20 wherein said another member comprises at least one of a diffuser, brightness enhancement film and an optical device.

22. The illuminator of claim 1 wherein said member is covered by a transparent ultraviolet protective film or sleeve.

23. The illuminator of claim 1 wherein said panel member has a greater width than thickness and top and bottom surfaces, said notches being in at least one of said surfaces for causing light to be reflected or refracted out of said member.

24. The illuminator of claim 23 wherein said notches are in both of said surfaces.

25. The illuminator of claim 23 wherein additional notches are in side edges of said member to reflect tight where needed.

26. The illuminator of claim 23 wherein said member has a generally rectangular shape.

27. The illuminator of claim 23 wherein said member has a non-uniform shape.

28. The illuminator of claim 27 wherein said member has an arcuate shape with curved side edges.

29. The illuminator of claim 28 wherein said curved side edges are covered with a reflective material.

30. The illuminator of claim 28 wherein said member has at least one sideways enlargement.

31. The illuminator of claim 30 wherein said member has a plurality of sideways enlargements.

32. The illuminator of claim 28 wherein said member is generally ring shaped with spaced apart end edges, and a light source is coupled to only one of said end edges.

33. The illuminator of claim 28 wherein said member is generally ring shaped with spaced apart end edges, and light sources are coupled to both of said end edges.

34. The illuminator of claim 28 wherein said member is generally ring shaped with joined end edges, and a single light source is coupled to said joined end edges.

35. The illuminator of claim 1 wherein said notches are in multiple surfaces of said member.

36. The illuminator of claim 35 wherein said notches are in two or more sides of said member.

37. The illuminator of claim 1 wherein the axes of said notches are angled more perpendicular to the axis of said member as the distance of said notches from said light receiving end edge increases to obtain a more uniform light output distribution from said member.

38. The illuminator of claim 1 wherein said notches are located along an arc extending along the length of said member to obtain a selected light output distribution from said member.

39. The illuminator of claim 1 wherein said member has a cylindrical cross-sectional shape.

40. The illuminator of claim 1 wherein said member has an elliptical cross-sectional shape.

41. The illuminator of claim 1 wherein said member has a semi-cylindrical cross-sectional shape.

42. The illuminator of claim 1 wherein said member has a rectangular cross-sectional shape with four sides.

43. The illuminator of claim 42 wherein said notches are only in one of said sides.

44. The illuminator of claim 42 wherein said notches are in three of said sides.

45. The illuminator of claim 1 wherein said member has a triangular cross-sectional shape.

46. An illuminator comprising a transparent light emitting member having at least one light receiving edge for receiving light from a light source for transmission through said member by internal reflection, and a pattern of shallow notches in a surface of said member for causing light to be reflected or refracted out of said member, said light source being attached to said edge by a tubular sleeve having opposite ends attached to said light source and said edge.

47. The illuminator of claim 46 wherein said opposite ends of said tubular sleeve are heat shrunk onto said light source and said edge.

48. An illuminator comprising a transparent light emitting member having at least one light receiving edge for receiving light from a light source for transmission through said member by internal reflection, and a pattern of shallow notches in a surface of said member for causing light to be reflected or refracted out of said member, at least some of said notches being coated with different colored coatings for decorative purposes when said member is lighted by a white light source.

* * * * *